(12) United States Patent
Hartenstine et al.

(10) Patent No.: US 9,428,207 B2
(45) Date of Patent: Aug. 30, 2016

(54) CUP HOLDER MODULE, TRAY AND STROLLER THEREOF

(71) Applicants: Curtis M. Hartenstine, Birdsboro, PA (US); Andrew J. Taylor, Mohnton, PA (US); Anthony V. Ruggiero, Downingtown, PA (US)

(72) Inventors: Curtis M. Hartenstine, Birdsboro, PA (US); Andrew J. Taylor, Mohnton, PA (US); Anthony V. Ruggiero, Downingtown, PA (US)

(73) Assignee: Wonderland Nurserygoods Company Limited, NT (HK)

( * ) Notice: Subject to any disclaimer, the term of this patent is extended or adjusted under 35 U.S.C. 154(b) by 0 days.

(21) Appl. No.: 14/682,114

(22) Filed: Apr. 9, 2015

(65) Prior Publication Data

US 2015/0291201 A1    Oct. 15, 2015

Related U.S. Application Data

(60) Provisional application No. 61/995,441, filed on Apr. 10, 2014.

(51) Int. Cl.
*B62B 9/00* (2006.01)
*B62B 7/10* (2006.01)
*B62B 3/02* (2006.01)
*B62B 9/26* (2006.01)
*A47C 7/62* (2006.01)
*A47C 7/68* (2006.01)

(52) U.S. Cl.
CPC ............... *B62B 9/00* (2013.01); *B62B 3/022* (2013.01); *B62B 7/10* (2013.01); *B62B 9/26* (2013.01); *A47C 7/62* (2013.01); *A47C 7/68* (2013.01)

(58) Field of Classification Search
CPC .............. A47C 7/62; B62B 9/26; B62B 9/00
See application file for complete search history.

(56) References Cited

U.S. PATENT DOCUMENTS

| | | |
|---|---|---|
| 3,313,508 A | 4/1967 | Mancl |
| 5,143,335 A | 9/1992 | Frankel |
| 5,421,638 A | 6/1995 | Ayotte |
| 5,464,183 A | 11/1995 | McConnell |
| 5,503,297 A | 4/1996 | Frankel |
| 5,857,601 A | 1/1999 | Greenwood |
| 5,876,057 A | 3/1999 | Huang |
| 6,139,046 A | 10/2000 | Aalund |
| 6,227,511 B1 | 5/2001 | De Costa |
| 6,264,153 B1 | 7/2001 | Ragner |
| 6,361,105 B1 | 3/2002 | Turner |
| 6,368,006 B1 * | 4/2002 | Yang .................. B62B 9/26 403/104 |
| 6,478,327 B1 | 11/2002 | Hartenstine |
| 2002/0005628 A1 | 1/2002 | Hartenstine |
| 2005/0051690 A1 | 3/2005 | Phillips |
| 2007/0024029 A1 | 2/2007 | Dotsey |

(Continued)

*Primary Examiner* — Erez Gurari
(74) *Attorney, Agent, or Firm* — Winston Hsu; Scott Margo

(57) ABSTRACT

A cup holder module is detachably mounted on a mount of a stroller and includes a cup holder, a mounting arm formed from the cup holder, and a first mounting latch. The mount has an engaging groove. The first mounting latch is disposed on the mounting arm and has a first button movably disposed on the mounting arm, a clamping base connected to the first button and disposed in the mounting arm, and an elastic member. The elastic member is disposed on the clamping base for biasing the clamping base to clamp the mount cooperatively with the mounting arm when the mounting arm is mounted on the mount and the first button is engaged with the engaging groove. When the first button is pressed to move the clamping base to an unlatched position, the clamping base is separate from the mount to make the mounting arm detachable from the mount.

12 Claims, 11 Drawing Sheets

(56) References Cited

U.S. PATENT DOCUMENTS

| | | |
|---|---|---|
| 2010/0276909 A1 | 11/2010 | Liu |
| 2011/0139948 A1 | 6/2011 | Bergin |
| 2012/0007394 A1 | 1/2012 | Nelson |
| 2012/0097721 A1 | 4/2012 | Winterhalter |
| 2012/0104729 A1 | 5/2012 | Yi |
| 2012/0193893 A1 | 8/2012 | Conrad |
| 2013/0119626 A1 | 5/2013 | Haut |
| 2013/0134266 A1 | 5/2013 | Lai |
| 2013/0234478 A1 | 9/2013 | Peck |
| 2013/0327906 A1 | 12/2013 | Liu |
| 2015/0251681 A1 | 9/2015 | Castillo |

\* cited by examiner

CUP HOLDER MODULE, TRAY AND STROLLER THEREOF

CROSS REFERENCE TO RELATED APPLICATIONS

This application claims the benefit of U.S. Provisional Application No. 61/995,441, which was filed on Apr. 10, 2014, and is incorporated herein by reference.

BACKGROUND OF THE INVENTION

1. Field of the Invention

The present invention relates to a cup holder module, a tray and a stroller thereof, and more specifically, to a cup holder module detachably mounted on a mount of a stroller via engagement of a mounting latch and the mount, a tray and a stroller thereof.

2. Description of the Prior Art

In general, a conventional stroller usually has a cup holder module (e.g. assembly of a cup holder and a tray) disposed thereon to give a caregiver a place to store and conveniently access items, such as infant supplies (e.g. snacks) or a feeding bottle. However, the cup holder module is usually attached to the stroller at a specific location and in only one configuration. Furthermore, the cup holder module is also removable for use of convenience, but then needs to be stored somewhere (e.g. at home, in a car, or in a stroller basket), such that the cup holder module can be easily misplaced and lost. Also, the caregiver cannot determine if he wants more or less cup holder modules for himself or the child sitting on the stroller since he is limited to the permanent configuration offered by the cup holder module, so as to cause the caregiver much inconvenience in use of the cup holder module.

SUMMARY OF THE INVENTION

The present invention provides a cup holder module detachably mounted on a mount of a stroller. The mount has an engaging groove formed thereon. The cup holder module includes a cup holder, a mounting arm, and a first mounting latch. The mounting arm is formed from the cup holder. The first mounting latch is disposed on the mounting arm and has a first button, a clamping base, and an elastic member. The first button is movably disposed on the mounting arm. The clamping base is connected to the first button and disposed in the mounting arm. The elastic member is disposed on the clamping base for providing a first elastic force to bias the clamping base toward a latched position to clamp the mount cooperatively with the mounting arm when the mounting arm is mounted on the mount and the first button is engaged with the engaging groove. When the first button is pressed to overcome the first elastic force generated by the elastic member for moving the clamping base from the latched position to an unlatched position, the clamping base is separate from the mount so as to make the mounting arm detachable from the mount.

The present invention further provides a tray mounted on a mount of a stroller. The mount has an engaging groove formed thereon. The tray includes a tray structure, a mounting arm, and a first mounting latch. The mounting arm is formed from the tray structure. The first mounting latch is disposed on the mounting arm and has a first button, a clamping base, and an elastic member. The first button is movably disposed on the mounting arm. The clamping base is connected to the first button and disposed in the mounting arm. The elastic member is disposed on the clamping base for providing a first elastic force to bias the clamping base toward a latched position to clamp the mount cooperatively with the mounting arm when the mounting arm is mounted on the mount and the first button is engaged with the engaging groove. When the first button is pressed to overcome the first elastic force generated by the elastic member for moving the clamping base from the latched position to an unlatched position, the clamping base is separate from the mount so as to make the mounting arm detachable from the mount.

The present invention further provides a stroller including a seat, a handle, a main frame, and at least one cup holder module. The handle has at least one first mount disposed thereon. The main frame is connected to the handle and the seat and has at least one second mount disposed on at least one side of the seat. The at least one cup holder module is detachably mounted on at least one of the at least one first mount and the at least one second mount.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
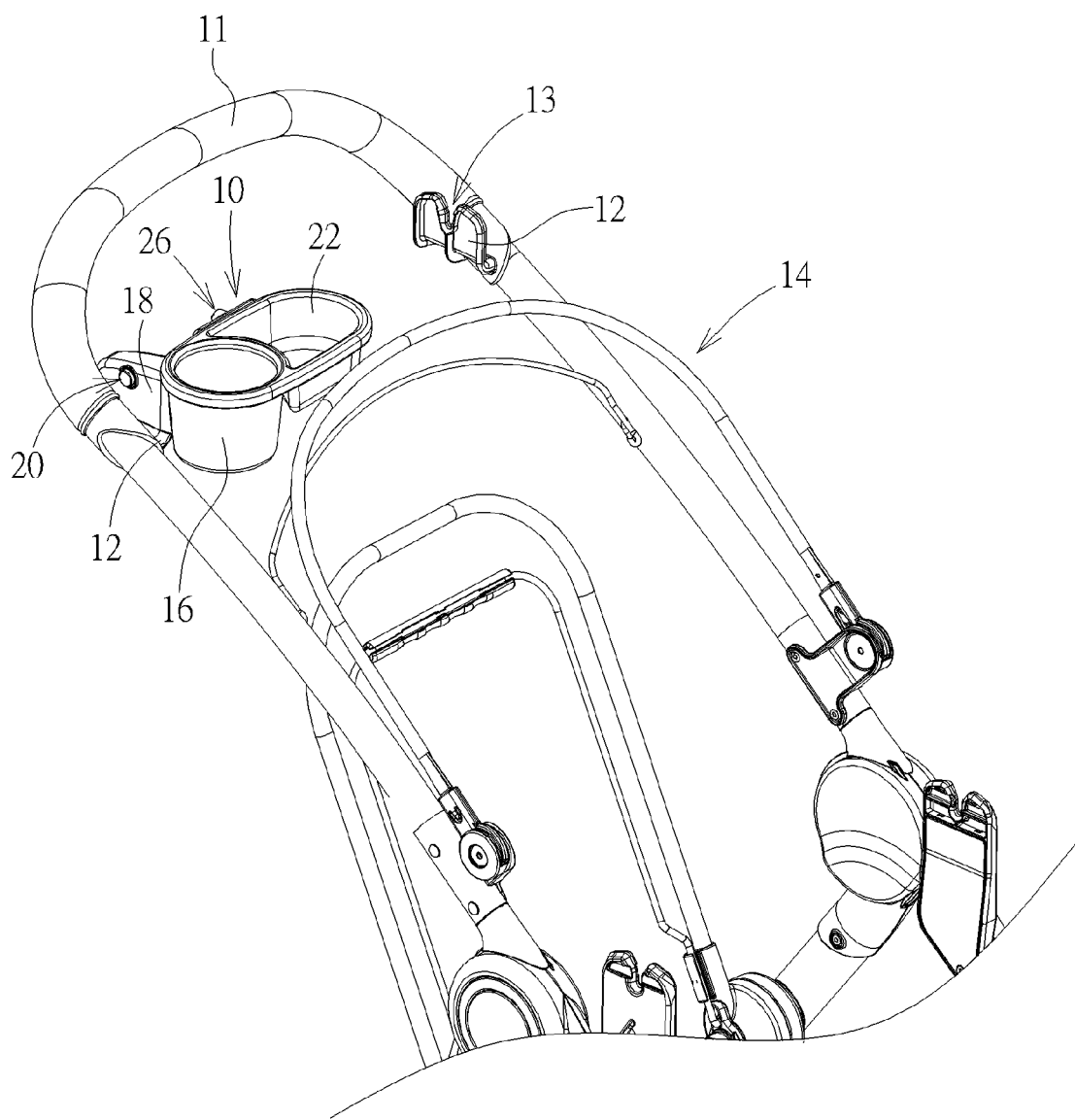
FIG. 1 is a diagram of a cup holder module with a tray being mounted on a mount of a stroller according to a first embodiment of the present invention.

Please refer to FIG. 1, which is a diagram of a cup holder module 10 with a tray 22 being mounted on a mount 12 of a stroller 14 according to a first embodiment of the present invention. In FIG. 1, the stroller 14 is depicted partially for clearly showing the structural design of the cup holder module 10, and the related description for the mechanical design of the stroller 14 is omitted herein since it is commonly seen in the prior art. In this embodiment, the mount 12 could be one of two cup mounts disposed on a handle 11 of the stroller 14 (as shown in FIG. 1) for providing a caregiver with more storage space, but not limited thereto, meaning that the mount 12 could be other mount structure of the stroller 14 (e.g. a car seat mount for mounting an infant car seat).

The mount 12 has an engaging groove 13 formed thereon, so that a caregiver could mount the cup holder module 10 on the stroller 14 via engagement of the cup holder module 10 and the engaging groove 13 of the mount 12.

Figure 2:
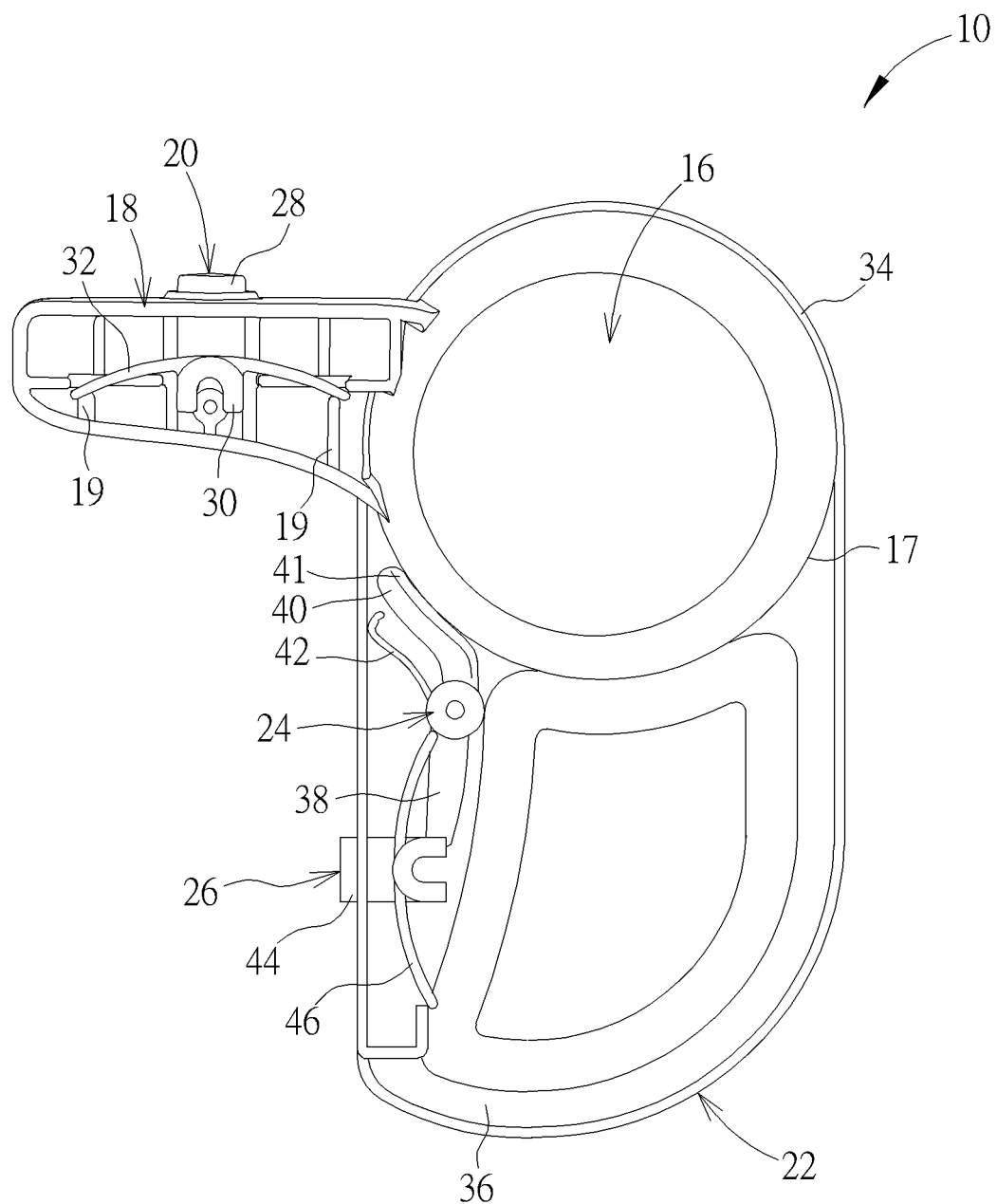
FIG. 2 is a bottom view of the cup holder module with the tray in FIG. 1.

More detailed description for the cup holder module 10 is provided as follows. Please refer to FIG. 1 and FIG. 2. FIG. 2 is a bottom view of the cup holder module 10 with the tray 22 in FIG. 1. As shown in FIG. 1 and FIG. 2, the cup holder module 10 is preferably made of injection molded plastic (but not limited thereto) and includes a cup holder 16, a mounting arm 18, a first mounting latch 20, the tray 22, a lever arm 24, and a second mounting latch 26. The cup holder 16 and the tray 22 could be utilized to give a caregiver a place to store and conveniently access items, such as infant supplies (e.g. snacks) or a feeding bottle. The mounting arm 18 is formed from the cup holder 16. The first mounting latch 20 is disposed on the mounting arm 18 and has a first button 28, a clamping base 30, and an elastic member 32. The first button 28 is movably disposed on the mounting arm 18 for a user to press. The clamping base 30 is connected to the first button 28 and disposed in the mounting arm 18. The elastic member 32 is disposed on the clamping base 30 for providing an elastic force to bias the clamping base 30 toward a latched position as shown in FIG. 2. To be more specific, in this embodiment, the mounting arm 18 has a rib structure 19 formed therein, the elastic member 32 is a curved flex beam extending from two sides of the clamping base 30, and two free ends of the curved flex beam abut against the rib structure 19 in the mounting arm 18 respectively for providing the elastic force to bias the clamping base 30. To be noted, the elastic member 32 is not limited to the curved flex beam. For example, in another embodiment, the elastic member 32 could be other conventional component capable of providing elastic force, such as a compressed spring.

As shown in FIG. 2, the tray 22 has a ring structure 34 and a tray structure 36 formed from the ring structure 34, and the lever arm 24 is pivotally disposed in the tray structure 36 and has a first arm portion 38, a second arm portion 40, and an elastic portion 42. In this embodiment, the elastic portion 42 is an elastic arm (but not limited thereto) and abuts against the tray structure 36 for providing an elastic force to make the second arm portion 40 clamp a periphery 17 of the cup holder 16 cooperatively with the ring structure 34 when the ring structure 34 is disposed on the cup holder 16 (as shown in FIG. 2). Furthermore, as shown in FIG. 2, the second mounting latch 26 has a second button 44 and a curved flex beam 46. The second button 44 is movably disposed on the tray structure 36 for a user to press and abuts against the first arm portion 38. The curved flex beam 46 extends from the second button 44 in the tray structure 36 and abuts against the tray structure 36 for providing an elastic force to bias the second button 44 toward a releasing position as shown in FIG. 2. It should be mentioned that the tray 22, the lever arm 24, and the second mounting latch 26 could be omissible components so as to simplify the structural design of the cup holder module 10. As for which design is utilized, it depends on the practical application of the cup holder module 10.

To be noted, via the aforesaid design in which the second arm portion 40 clamps the periphery 17 of the cup holder 16 cooperatively with the ring structure 34, the tray 22 could be pivotable relative to the cup holder 16 so that a caregiver could perform pivoting adjustment of the tray 22 to rotate the tray 22 to any preferred position for storage convenience. Furthermore, as shown in FIG. 2, the second arm portion 40 has a chamfer angle 41 corresponding to the periphery 17 of the cup holder 16 for guiding the second arm portion 40 to clamp the periphery 17 of the cup holder 16 smoothly when the ring structure 34 is disposed on the cup holder 16.

Figure 3:
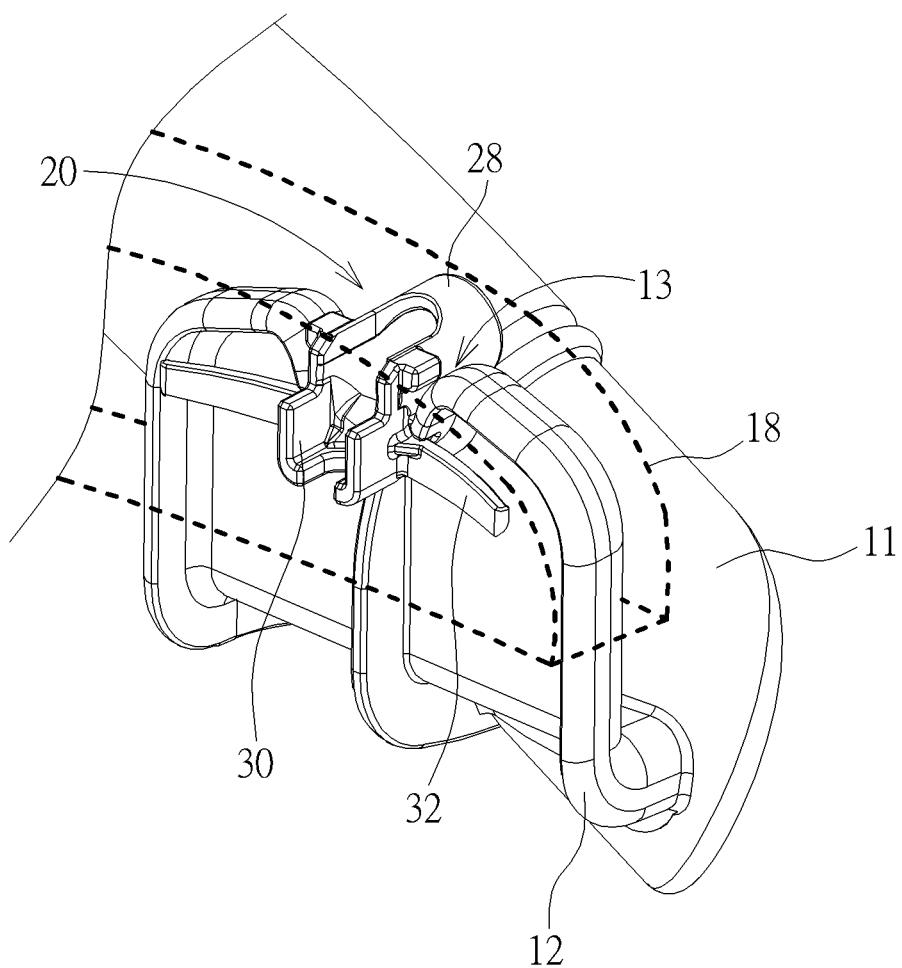
FIG. 3 is an assembly diagram of a mounting arm in FIG. 2 being mounted on the mount.

Via the aforesaid designs, when a caregiver wants to mount the cup holder module 10 on the stroller 14, the caregiver just needs to align the mounting arm 18 of the cup holder module 10 with the mount 12 of the stroller 14, and then press the mounting arm 18 to make the first button 28 engaged with the engaging groove 13 on the mount 12 (as shown in FIG. 3, which is an assembly diagram of the mounting arm 18 in FIG. 2 being mounted on the mount 12). At this time, as shown in FIG. 2 and FIG. 3, the elastic member 32 could provide the elastic force to bias the clamping base 30 toward the latched position as shown in FIG. 3, so that the clamping base 30 could clamp the mount 12 cooperatively with the mounting arm 18. In such a manner, via the design that the first button 28 is engaged with the engaging groove 13 and the mount 12 is clamped by the clamping base 30 of the first mounting latch 20 and the mounting arm 18, the cup holder module 10 could be disposed on the stroller 14 steadily for providing more storage space, so that the user could store and access items conveniently, such as infant supplies (e.g. snacks) or a feeding bottle.

On the other hand, when the caregiver wants to detach the cup holder module 10 from the stroller 14, the caregiver just needs to press the first button 28 to overcome the elastic force of the elastic member 32, so as to move the clamping base 30 from the latched position as shown in FIG. 3 to an unlatched position for making the clamping base 30 separate from the mount 12. At this time, since the mount 12 is no longer clamped by the clamping base 30 of the first mounting latch 20 and the mounting arm 18, engagement of the first mounting latch 20 and the mount 12 could be released easily, so that the caregiver could detach the cup holder module 10 from the stroller 14 conveniently and quickly and then could mount the cup holder module 10 on another mount 12 (e.g. a car seat mount or another cup mount) of the stroller 14. In such a manner, the present invention could greatly increase flexibility of the cup holder module 10 to configure the cup holder 12 and the tray 22 however the caregiver desires to give a child sitting on the stroller 14 all or none of the cup holder 12 and the tray 22 or give himself all or none depending on the current needs, so as to solve the prior art problem that the removable cup holder module is easily misplaced and lost and the caregiver is limited to the permanent configuration offered by the cup holder module. Furthermore, the present invention allows that the caregiver could move the cup holder module 10 to parent mounts (i.e. the mounts 12 located at the handle 11 in FIG. 1) so that lower mounts of the stroller 14 (i.e. car seat mounts located lower than the mounts 12 in FIG. 1) could attach an infant car seat and the cup holder module 10 does not need to stored off of the stroller 14 where it could get lost.

Similarly, if the caregiver wants to detach the tray 22 from the cup holder 16, the caregiver just needs to press the second button 44 from the releasing position as shown in FIG. 2 to a pressing position for driving the first arm portion 38 to rotate relative to the tray structure 36. Accordingly, the second arm portion 40 could be separate from the periphery 17 of the cup holder 16 with rotation of the first arm portion 38. In such a manner, since the periphery 17 of the cup holder 16 is no longer clamped by the second arm portion 40 of the lever arm 24 and the ring structure 34, the caregiver could detach the tray 22 from the cup holder 16 conveniently and quickly.

Figure 4:
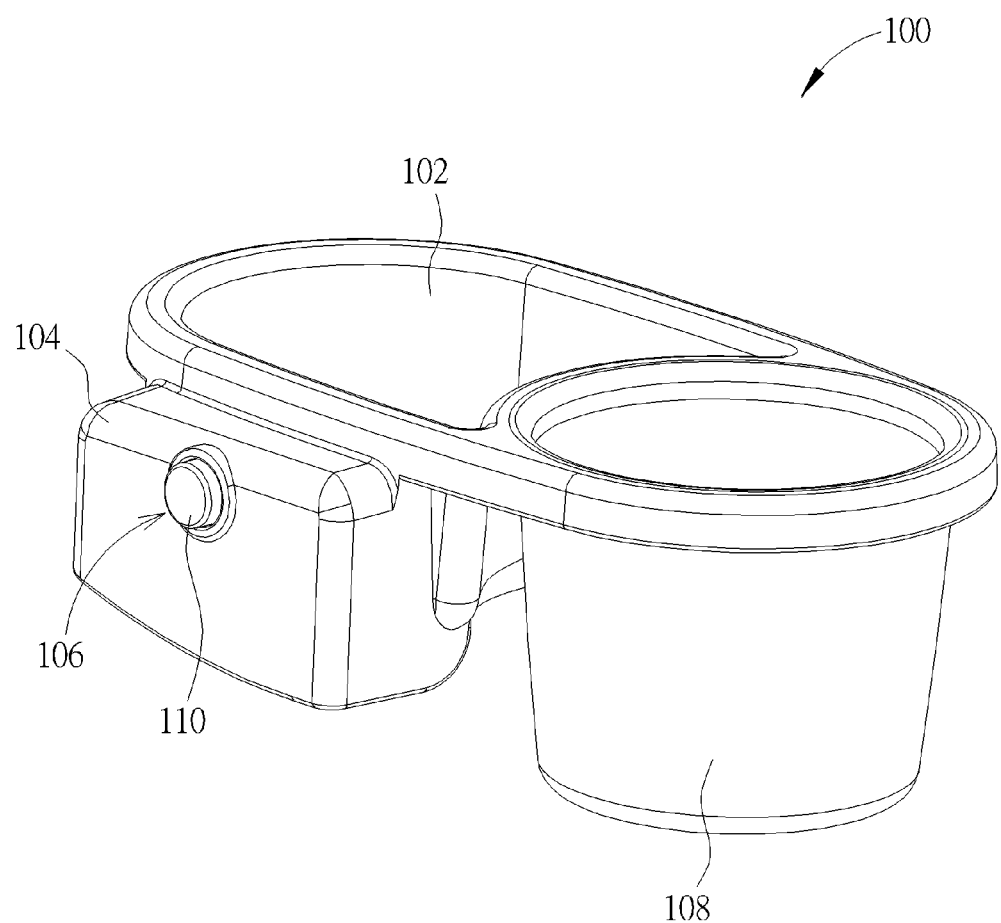
FIG. 4 is a diagram of a tray according to a second embodiment of the present invention.
Figure 5:
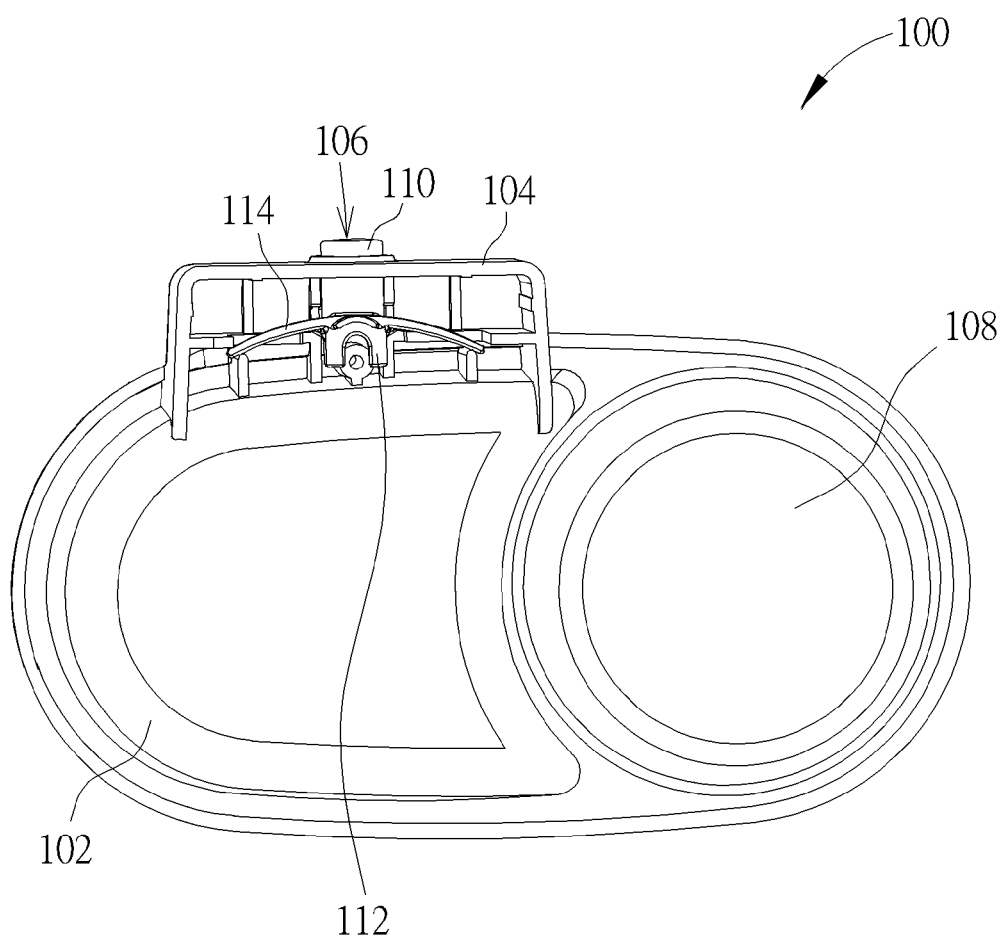
FIG. 5 is a bottom view of the tray in FIG. 4.

Moreover, please refer to FIG. 4 and FIG. 5. FIG. 4 is a diagram of a tray 100 according to a second embodiment of the present invention. FIG. 5 is a bottom view of the tray 100 in FIG. 4. Components both mentioned in the first embodiment and the second embodiment represent components with similar functions or structures. As shown in FIG. 4 and FIG. 5, the tray 100 includes a tray structure 102, a mounting arm 104, a mounting latch 106, and a cup holder 108. The mounting arm 104 is formed from the tray structure 102. The mounting latch 106 is disposed on the mounting arm 104 and has a button 110, a clamping base 112, and an elastic member 114. The button 110 is movably disposed on the mounting arm 104 for a user to press. The clamping base 112 is connected to the button 110 and disposed in the mounting arm 104. The elastic member 114 is disposed on the clamping base 112 for providing an elastic force to bias the clamping base 112, so as to clamp a mount (e.g. a cup mount or a car seat mount) of a stroller cooperatively with the mounting arm 104 when the mounting arm 104 is mounted on the mount and the button 110 is engaged with an engaging groove of the mount. In this embodiment, the cup holder 108 could be formed from the tray structure 102. Accordingly, the cup holder 108 and the tray structure 102 could be utilized to give a caregiver a place to store and conveniently access items, such as infant supplies (e.g. snacks) or a feeding bottle. As for the related description for the structural design of the elastic member 114 (e.g. a curved flex beam or a compressed spring) and assembly and disassembly of the tray 100 on amount of a stroller, it could be reasoned by analogy according to the first embodiment and therefore omitted for simplicity.

To be noted, the design that the tray is detachable from the cup holder aforementioned in the first embodiment could be also applied to the tray 100. That is, in another embodiment, the tray 100 could utilize assembly of the mounting latch and the lever arm aforementioned in the first embodiment to make the lever arm clamp the cup holder 108 cooperatively with the tray structure 102 and then make the tray 100 pivotable relative to the cup holder 18 for storage convenience, so as to make the cup holder 108 detachable from the tray structure 102 instead of being integrally formed on the tray structure 102. As for how to detach the tray 100 from the detachable cup holder 108, the related description is omitted herein since it could be reasoned by analogy according to the first embodiment.

Figure 6:
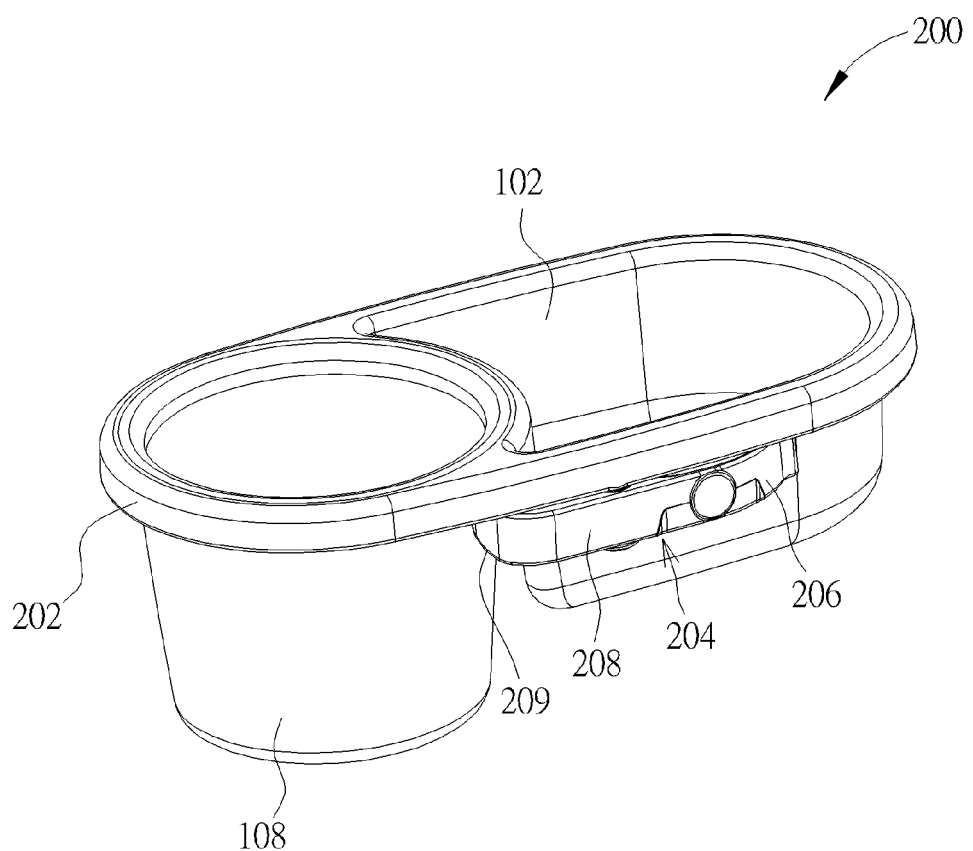
FIG. 6 is a diagram of a tray according to a third embodiment of the present invention.
Figure 7:
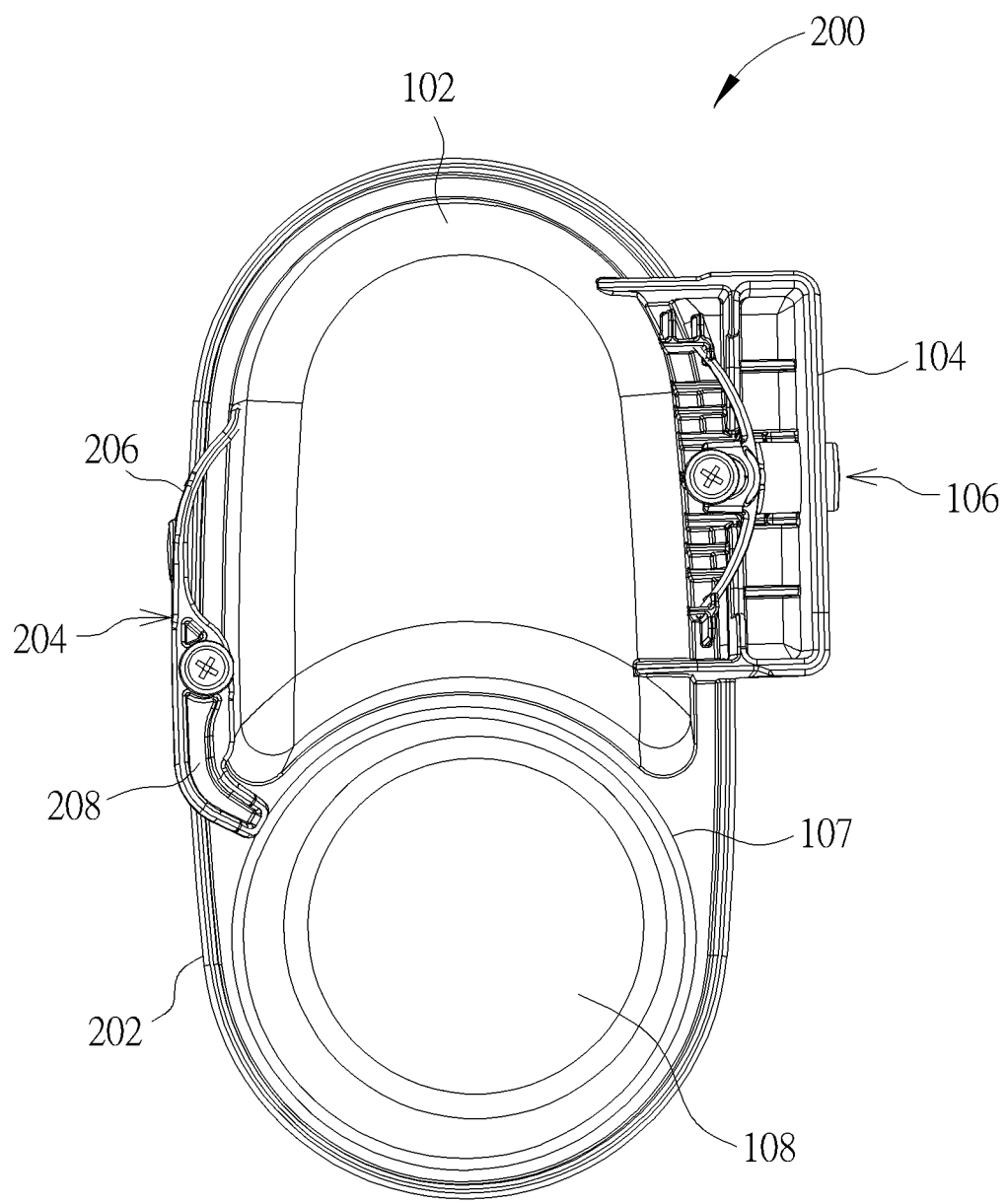
FIG. 7 is a bottom view of the tray in FIG. 6.

Furthermore, the structural design of the lever arm is not limited to the first embodiment. For example, please refer to FIG. 6 and FIG. 7. FIG. 6 is a diagram of a tray 200 according to a third embodiment of the present invention. FIG. 7 is a bottom view of the tray 200 in FIG. 6. Components both mentioned in the third embodiment and the aforementioned embodiments represent components with similar functions or structures. As shown in FIG. 6 and FIG. 7, the tray 200 includes the tray structure 102, the mounting arm 104, the mounting latch 106, the cup holder 108, a ring structure 202, and a lever arm 204. The ring structure 202 is formed from the tray structure 102. The lever arm 204 is pivotally disposed on the tray structure 102 and has an elastic arm portion 206 and a clamping arm portion 208. The elastic arm portion 206 abuts against the tray structure 102 for providing an elastic force to make the clamping arm portion 208 clamp a periphery 107 of the cup holder 108 cooperatively with the ring structure 202 when the ring structure 202 is disposed on the cup holder 108. Moreover, as shown in FIG. 6, the clamping arm portion 208 has a chamfer angle 209 corresponding to the periphery 107 of the cup holder 108 for guiding the clamping arm portion 208 to clamp the periphery 107 of the cup holder 108 smoothly when the ring structure 202 is disposed on the cup holder 108.

In such a manner, if a caregiver wants to detach the cup holder 108 from the ring structure 202, the caregiver just needs to press the elastic arm portion 206 for driving the clamping arm portion 208 to rotate relative to the tray structure 102. Accordingly, the clamping arm portion 208 could be separate from the periphery 107 of the cup holder 108. Accordingly, since the periphery 107 of the cup holder 108 is no longer clamped by the clamping arm portion 208 of the lever arm 204 and the ring structure 202, the caregiver could detach the cup holder 108 from the tray structure 202 conveniently and quickly.

Figure 8:
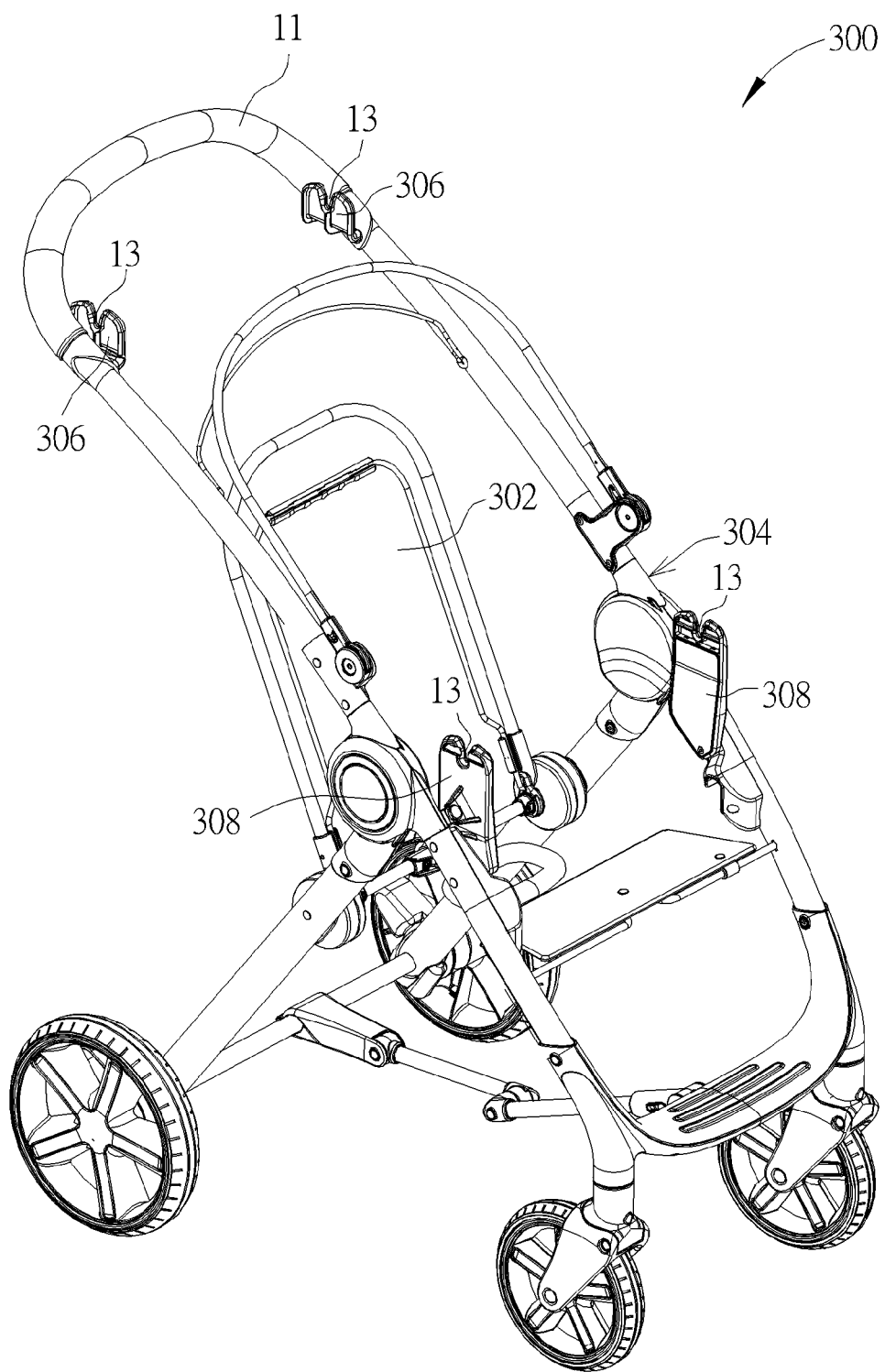
FIG. 8 is a diagram of a stroller according to a fourth embodiment of the present invention.

Furthermore, please refer to FIG. 8, which is a diagram of a stroller 300 according to a fourth embodiment of the present invention. Components both mentioned in the fourth embodiment and the aforementioned embodiments represent components with similar structures or functions, and the related description is omitted herein. As shown in FIG. 8, the stroller 300 includes a seat 302, the handle 11, and a main frame 304. The handle 11 has at least one first mount 306 (two as shown in FIG. 8, but not limited thereto) having the engaging groove 13 formed thereon. The main frame 304 is connected to the handle 11 and the seat 302 and has two second mounts 308 disposed at two sides of the seat 302 respectively (but not limited thereto). In this embodiment, the second mount 308 is a car seat mount for mounting an infant car seat and has the engaging groove 13 formed thereon.

Figure 9:
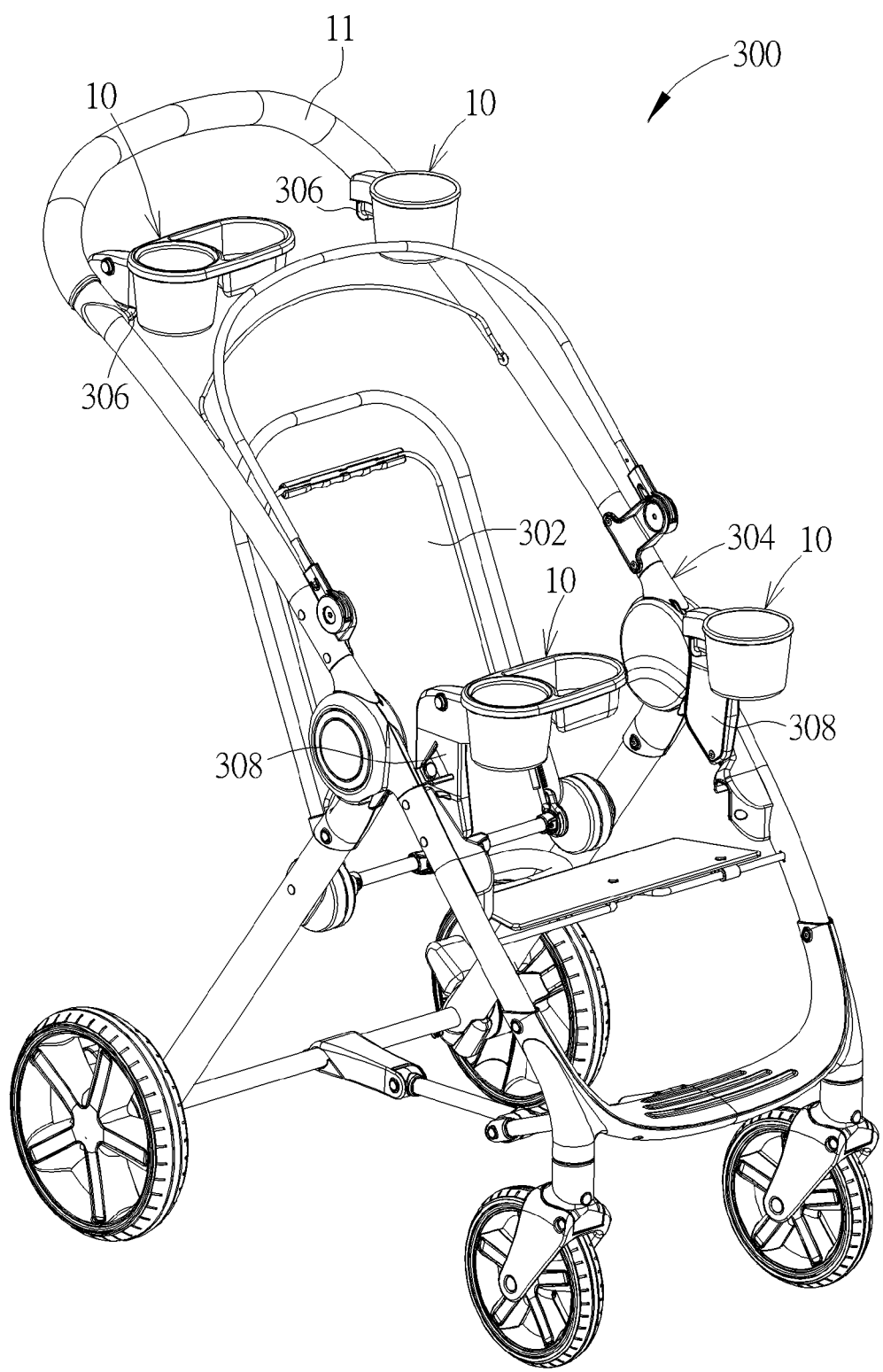
FIG. 9 is a diagram of the stroller in FIG. 8 having four cup holder modules disposed thereon.

Please refer to FIG. 9, which is a diagram of the stroller 300 in FIG. 8 having four cup holder modules 10 disposed thereon. The related description for the cup holder module 10 is aforementioned in the first embodiment and therefore omitted herein. As shown in FIG. 9, the stroller 300 further includes at least one cup holder module 10 (four shown in FIG. 9, but not limited thereto). In practical application, when an infant car seat is not mounted on the second mount 308, the cup holder module 10 could be mounted on the first mount 306 and the second mount 308 respectively for a caregiver and a child sitting on the seat 302 to use. For example, as shown in FIG. 9, the two cup holder modules 10 could be mounted on the first mount 306 and the second mount 308 located at the left side of the stroller 300 respectively, and the two cup holder modules 10 without the tray 22 could be mounted on the first mount 306 and the second mount 308 located at the right side of the stroller 300 respectively. In such a manner, the caregiver and the child could access items stored in the cup holder module 10 conveniently, such as infant supplies (e.g. snacks) or a feeding bottle.

Figure 10:
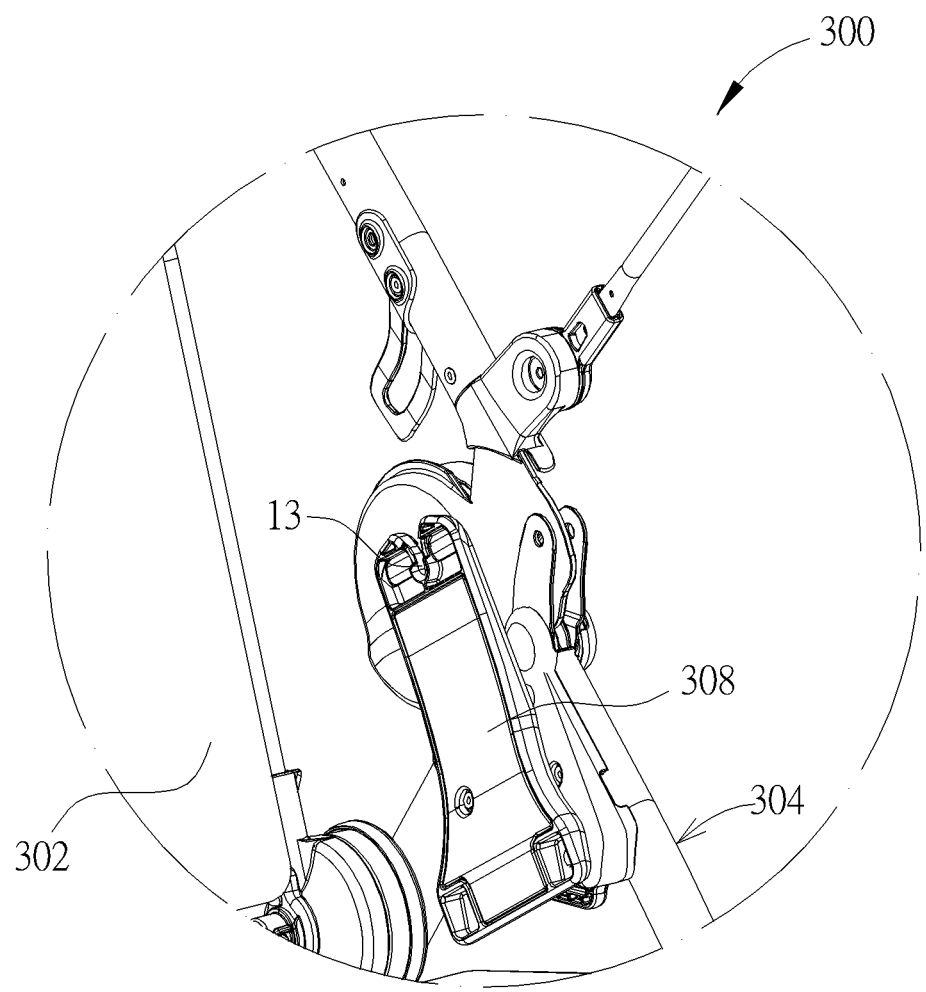
FIG. 10 is an enlarged diagram of a second mount in FIG. 9 being stowed in a main frame of the stroller.

On the other hand, when an infant car seat is mounted on the second mount 308 or the second mount 308 is stowed in the main frame 304 (as shown in FIG. 10), the cup holder module 10 could only be mounted on the first mount 306 for the caregiver. As for the derived embodiments for configuration of the cup holder module 10 on the stroller 300, the related description could be reasoned by analogy according to the aforementioned embodiments and omitted herein.

Figure 11:
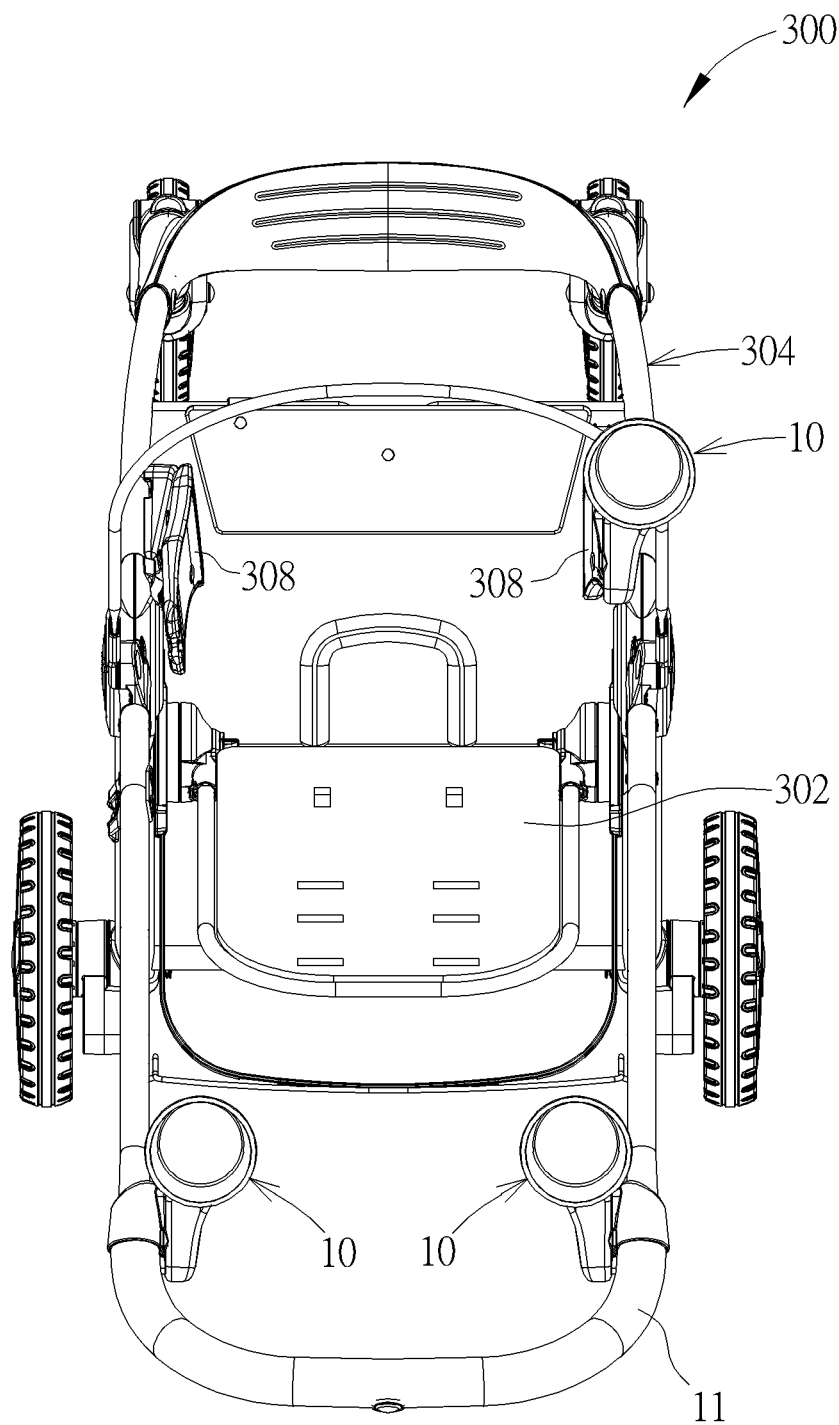
FIG. 11 is a top view of the cup holder module without a tray being mounted on the second mount toward the outside of the stroller in FIG. 8.

Furthermore, in practical application, the cup holder module 10 could be mounted on the second mount 308 as shown in FIG. 11, allowing the cup holder module 10 without the tray 22 to be positioned toward the outside of the stroller 300, so as to make sure that configuration of the cup holder module 10 on the stroller 300 does not cause a child any inconvenience in sitting on the seat 302.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cup holder module detachably mounted on a mount of a stroller, the mount having an engaging groove formed thereon, the cup holder module comprising:
   a cup holder;
   a mounting arm formed from the cup holder; and
   a first mounting latch disposed on the mounting arm and having a first button, a clamping base, and an elastic member, the first button being movably disposed on the mounting arm, the clamping base being connected to the first button and disposed in the mounting arm, the elastic member being disposed on the clamping base for providing a first elastic force to bias the clamping base toward a latched position to clamp the mount cooperatively with the mounting arm when the mounting arm is mounted on the mount and the first button is engaged with the engaging groove;
   wherein when the first button is pressed to overcome the first elastic force generated by the elastic member for moving the clamping base from the latched position to an unlatched position, the clamping base is separate from the mount so as to make the mounting arm detachable from the mount.

2. The cup holder module of claim 1, wherein the mounting arm has a rib structure formed therein, the elastic member is a curved flex beam extending from two sides of the clamping base, and two free ends of the curved flex beam abut against the rib structure in the mounting arm respectively for providing the first elastic force to bias the clamping base toward the latched position.

3. The cup holder module of claim 1, wherein the elastic member is a compressed spring disposed between the clamping base and the mounting arm for providing the first elastic force to bias the clamping base toward the latched position.

4. The cup holder module of claim 1 further comprising:
   a tray having a ring structure and a tray structure formed from the ring structure;
   a lever arm pivotally disposed in the tray structure and having a first arm portion, a second arm portion, and an elastic portion, the elastic portion abutting against the tray structure for providing a second elastic force to make the second arm portion clamp a periphery of the cup holder cooperatively with the ring structure so as to make the tray pivotable relative to the cup holder when the ring structure is disposed on the cup holder; and
   a second mounting latch having a second button and a curved flex beam, the second button being movably disposed on the tray structure and abutting against the first arm portion, the curved flex beam extending from the second button in the tray structure and abutting against the tray structure for providing a third elastic force to bias the second button toward a releasing position;
   wherein when the second button is pressed from the releasing position to a pressing position for driving the first arm portion to rotate relative to the tray structure, the second arm portion is separate from the periphery of the cup holder with rotation of the first arm portion so as to make the tray detachable from the cup holder.

5. The cup holder module of claim 4, wherein the second arm portion has a chamfer angle corresponding to the periphery of the cup holder.

6. The cup holder module of claim 1 further comprising:
   a tray having a ring structure and a tray structure formed from the ring structure; and
   a lever arm pivotally disposed on the tray structure and having an elastic arm portion and a clamping arm portion, the elastic arm portion abutting against the tray structure for providing a second elastic force to make the clamping arm portion clamp a periphery of the cup holder cooperatively with the ring structure so as to make the tray pivotable relative to the cup holder when the ring structure is disposed on the cup holder;
   wherein when the elastic arm portion is pressed for driving the clamping arm portion to rotate relative to the tray structure, the clamping arm portion is separate from the periphery of the cup holder so as to make the tray detachable from the cup holder.

7. The cup holder module of claim 6, wherein the clamping arm portion has a chamfer angle corresponding to the periphery of the cup holder.

8. A stroller comprising:
   a seat;
   a handle having at least one first mount disposed thereon;
   a main frame connected to the handle and the seat and having at least one second mount disposed on at least one side of the seat; and
   at least one cup holder module detachably mounted on at least one of the at least one first mount and the at least one second mount, the at least one first mount and the at least one second mount having an engaging groove formed thereon respectively, and the at least one cup holder module comprising:
      a cup holder;
      a mounting arm formed from the cup holder; and
      a first mounting latch disposed on the mounting arm and having a first button, a clamping base, and an elastic member, the first button being movably disposed on the mounting arm, the clamping base being connected to the first button and disposed in the mounting arm, the elastic member being disposed on the clamping base for providing a first elastic force to bias the clamping base toward a latched position to clamp the at least one of the at least one first mount and the at least one second mount cooperatively with the mounting arm when the mounting arm is mounted on the at least one of the at least one first mount and the at least one second mount and the first button is engaged with the engaging groove;
      wherein when the first button is pressed to overcome the first elastic force generated by the elastic member for moving the clamping base from the latched position to an unlatched position, the clamping base is separate from the at least one of the at least one first mount and the at least one second mount so as to make the mounting arm detachable from the at least one of the at least one first mount and the at least one second mount.

9. The stroller of claim 8, wherein the at least one cup holder module further comprises:
   a tray having a ring structure and a tray structure formed from the ring structure;
   a lever arm pivotally disposed in the tray structure and having a first arm portion, a second arm portion, and an elastic portion, the elastic portion abutting against the tray structure for providing a second elastic force to make the second arm portion clamp a periphery of the cup holder cooperatively with the ring structure so as to make the tray pivotable relative to the at least one cup holder when the ring structure is disposed on the cup holder; and a second mounting latch having a second button and a curved flex beam, the second button being movably disposed on the tray structure and abutting against the first arm portion, the curved flex beam extending from the second button in the tray structure and abutting against the tray structure for providing a third elastic force to bias the second button toward a releasing position;

wherein when the second button is pressed from the releasing position to a pressing position for driving the first arm portion to rotate relative to the tray structure, the second arm portion is separate from the periphery of the cup holder with rotation of the first arm portion so as to make the tray detachable from the cup holder.

10. The stroller of claim 8, wherein the at least one cup holder module further comprises:

a tray having a ring structure and a tray structure formed from the ring structure; and a lever arm pivotally disposed on the tray structure and having an elastic arm portion and a clamping arm portion, the elastic arm portion abutting against the tray structure for providing a second elastic force to make the clamping arm portion clamp a periphery of the cup holder cooperatively with the ring structure so as to make the tray pivotable relative to the cup holder when the ring structure is disposed on the cup holder;

wherein when the elastic arm portion is pressed for driving the clamping arm portion to rotate relative to the tray structure, the clamping arm portion is separate from the periphery of the cup holder so as to make the tray detachable from the cup holder.

11. The stroller of claim 8, wherein the at least one second mount is a car seat mount for mounting an infant car seat, and the at least one cup holder module is mounted on the at least one of the at least one first mount and the at least one second mount for providing storage space after the infant car seat is detached from the at least one second mount.

12. The stroller of claim 8, wherein the at least one second mount is a car seat mount for mounting an infant car seat, and the at least one cup holder module is mounted on the at least one first mount for providing storage space after the infant car seat is mounted on the at least one second mount or the at least one second mount is stowed in the main frame.

* * * * *